United States Patent
Van Der Lee et al.

(10) Patent No.: US 12,436,247 B2
(45) Date of Patent: Oct. 7, 2025

(54) LASER SENSOR MODULE WITH SOILING DETECTION

(71) Applicants: TRUMPF Photonic Components GmbH, Ulm (DE); Robert Bosch GmbH, Stuttgart (DE)

(72) Inventors: Alexander Marc Van Der Lee, Venlo (NL); Johannes Hendrikus Maria Spruit, Waalre (NL); Okke Ouweltjes, Eindhoven (NL); Robert Weiss, Waldbronn (DE)

(73) Assignees: TRUMPF PHOTONIC COMPONENTS GMBH, Ulm (DE); ROBERT BOSCH GMBH, Stuttgart (DE)

( * ) Notice: Subject to any disclaimer, the term of this patent is extended or adjusted under 35 U.S.C. 154(b) by 933 days.

(21) Appl. No.: 17/530,579

(22) Filed: Nov. 19, 2021

(65) Prior Publication Data
US 2022/0075042 A1    Mar. 10, 2022

Related U.S. Application Data

(63) Continuation of application No. PCT/EP2020/061152, filed on Apr. 22, 2020.

(30) Foreign Application Priority Data

May 22, 2019   (EP) .................................... 19175997

(51) Int. Cl.
G01S 7/48    (2006.01)
G01S 7/481   (2006.01)
G01S 7/497   (2006.01)

(52) U.S. Cl.
CPC ............ *G01S 7/497* (2013.01); *G01S 7/4813* (2013.01); *G01S 7/4815* (2013.01); *G01S 7/4816* (2013.01); *G01S 2007/4975* (2013.01)

(58) Field of Classification Search
CPC ...... G01S 7/497; G01S 7/4813; G01S 7/4815; G01S 7/4816; G01S 2007/4975
See application file for complete search history.

(56) References Cited

U.S. PATENT DOCUMENTS

| 2008/0088702 A1 | 4/2008 | Linsenmaier et al. |
| 2009/0279070 A1 | 11/2009 | Ueno |
| 2021/0116355 A1* | 4/2021 | Spruit .................. G01S 7/4916 |

FOREIGN PATENT DOCUMENTS

WO    WO 2018104153 A1    6/2018

* cited by examiner

*Primary Examiner* — Kevin K Pyo
(74) *Attorney, Agent, or Firm* — LEYDIG VOIT & MAYER LTD.

(57) ABSTRACT

A laser sensor module includes a laser diode configured emit a laser beam, an electrical driver configured to supply the laser diode with a driving current to stimulate emission of the laser beam, a detector, and an optical arrangement configured to focus the laser beam to a focus region. The laser diode is arranged to emit the laser beam through the optical arrangement to the focus region. The optical arrangement comprises an emission window. The detector is arranged to determine an interference signal. The laser sensor module comprises a soiling detection unit configured to vary a wavelength of the laser beam with a variation amplitude over a predetermined time period to provide a soiling detection signal indicative of a soiling of the emission window based on an interference signal during the wavelength variation of the laser beam.

15 Claims, 8 Drawing Sheets

LASER SENSOR MODULE WITH SOILING DETECTION

CROSS REFERENCE TO RELATED APPLICATIONS

This application is a continuation of International Application No. PCT/EP2020/061152 (WO 2020/233927 A1), filed on Apr. 22, 2020, and claims benefit to European Patent Application No. EP 19175997.6, filed on May 22, 2019. The aforementioned applications are hereby incorporated by reference herein.

FIELD

The present disclosure relates to a laser sensor module wherein the laser sensor module has a capability of detecting a soiling of an emission window of the laser sensor module. The laser sensor module is able to measure a particle density, a fluid velocity, a gesture, a distance to an object and/or the presence of objects. The disclosure further relates to a device, in particular a detector device or a mobile communication device comprising the laser sensor module. The disclosure further relates to a method of detecting a soiling of an emission window of a laser sensor module, and a corresponding computer program.

BACKGROUND

WO 2018/104153 A1 discloses a laser sensor module for measuring a particle density of particles using interference or self-mixing interference. The laser sensor module comprises lasers adapted to emit measurement laser beams. An optical arrangement focuses the measurement beams to measurement volumes. The laser beams are emitted through an emission window of the laser sensor module. In case of a blocking of the emission window of the laser sensor module by large particles, it is proposed to detect the blocking object by driving one of the lasers with a modulated drive current in predefined time periods. However, this document does not disclose how the detection of the blocking object may be performed in a reliable manner.

Reliable detection of a soiling of the emission window of the laser sensor module, even if the soiling is merely produced by fingerprints of the user of the device, is important to reliably carry out measurements with the laser sensor module, as such soilings have an impact on the accuracy of the measurement.

US 2008/0088702 A1 discloses a camera system of a vehicle, comprising a camera with an optical beam path which has at least one optical element to guide image information to a light-sensitive image sensor. At least one test beam can be coupled to a transparent test element arranged on the input side in front of the beam path and, depending on a degree of soiling of the test element, at least one partial beam indicating soiling can be directed from the test element onto a sensor to receive the partial beam indicating soiling.

US 2009/0279070 A1 discloses a semiconductor laser operating such that a first oscillation period of monotonically increasing the oscillation wavelength and a second oscillation of decreasing oscillation wavelength alternately exist. A photodiode converts laser light emitted from the laser and return light from a measurement target into electrical signals. A counting unit counts the number of interference waveform components obtained from an output signal of the photodiode in each of the first and second oscillation periods. A computing device calculates the distance to the measurement target from a shortest lasing wavelength and a longest lasing wavelength in a period during which the counting unit counts the number of interference waveform components and the counting result obtained by the counting unit. This makes it possible to measure the distance to the moving measurement target and the velocity of the measurement target.

SUMMARY

In an embodiment, the present disclosure provides a laser sensor module. The laser sensor module includes a laser diode configured emit a laser beam, an electrical driver configured to supply the laser diode with a driving current to stimulate emission of the laser beam, a detector, and an optical arrangement configured to focus the laser beam to a focus region. The laser diode is arranged to emit the laser beam through the optical arrangement to the focus region. The optical arrangement comprises an emission window. The detector is arranged to determine an interference signal. The laser sensor module comprises a soiling detection unit configured to vary a wavelength of the laser beam with a variation amplitude over a predetermined time period to provide a soiling detection signal indicative of a soiling of the emission window based on an interference signal during the wavelength variation of the laser beam. The variation amplitude and the predetermined time period are set to generate the soiling detection signal with a frequency in a range from 1 kHz to 100 MHz.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides a laser sensor module with increased reliability of measurements to be performed with the sensor module.

The present disclosure further provides a device with such an improved laser sensor module.

The present disclosure further provides a method of reliably detecting a soiling of an emission window of a laser sensor module.

The present disclosure further provides a corresponding computer program which may be carried out by a laser sensor module or a device having the laser sensor module.

According to a first aspect a laser sensor module is provided. The laser sensor module may be suited to measure a particle density of particles, a fluid velocity, a gesture, a distance to an object and/or the presence of objects. The laser sensor module comprises at least one laser diode, an electrical driver for supplying the laser diode with a driving current, a detector and an optical arrangement for focusing the laser beam to a focus region. The laser diode is arranged to emit a laser beam through the optical arrangement to the focus region, wherein the optical arrangement comprises an emission window. The detector is arranged to determine an interference signal. The laser sensor module comprises a soiling detection unit configured to vary a wavelength of the laser beam with a variation amplitude over a predetermined time period to provide a soiling detection signal indicative of a soiling of the emission window based on an interference signal during the wavelength variation of the laser beam. The variation amplitude and predetermined time period are set to generate the soiling detection signal with a frequency in a range from 1 kHz to 100 MHz, preferably from 1 kHz to 50 MHz, further preferably from 10 kHz to 1 MHz. Preferably, the predetermined time period of the wavelength variation is such that a duration of the soiling detection signal is in a range from 1 us to 5 ms, preferably from 10 us to 1 ms.

The interference signal may be a self-mixing interference (SMI) signal of an optical wave within a laser cavity of the laser diode. The interference signal or self-mixing interference signal may be generated by laser light of the laser beam reflected or scattered by at least one particle or an object, but may also be generated by scattering from the soiling. The laser sensor module may comprise two, three, four or more laser diodes and corresponding detectors. Using a plurality of laser beams instead of one laser beam for soiling detection may have the advantage that variations of the soiling detection signal due to speckles at the soiling may be reduced and soiling detection signal amplitude is increased, as will be described further below. The laser beams emitted by the different lasers may be inclined with respect to each other when transmitted through the emission window.

The wavelength variation of the laser beam over a set or predetermined time period enables detection of a soiling of the emission window of the laser sensor module from an interference signal during the wavelength variation. The wavelength variation generates optical path length differences (in number of waves) between the laser diode and the emission window during the predetermined time period. The predetermined time period is chosen to provide a soiling detection signal with a frequency and duration which can be well detected by front-end electronics of the sensor module or of a device having the sensor module.

Experiments have shown that measurements of e.g. particle density based on interference and especially self-mixing interference measurements is sensitive with respect to a soiling of the emission window through which the laser beam or laser beams are emitted. The soiling or pollution of the emission window may reduce intensity of the emitted laser light and the back-reflected laser light (causing two times corresponding transmission losses). Furthermore, the pollution may influence the spot quality in the measurement volume as well. Both defects result in an undesired reduction of detected particle concentration. The soiling or pollution of the emission window causes scattering of the laser light. Part of this scattered laser light will be reflected or scattered back into the laser cavity of the laser diode. The more pollution, the more laser light will be reflected towards the laser cavity. This reflected laser light just will give rise in a minor DC power change of the laser output, which also depends on the phase difference of the reflected laser light with respect to the standing wave pattern in the laser cavity. Consequently, the scattered light from pollution or soiling cannot be used in a straightforward way to detect the soiling using interference or self-mixing interference. From theory and experiments it is known that path length variations of the reflected laser light will occur if the wavelength of the laser beam is varied. These optical path length variations (in number of waves) will give rise to a detectable interference signal. However, deeper insights have shown that merely varying the wavelength of the laser beam is not sufficient for a reliable detection of a soiling, in particular fingerprints or very fine dust, on the emission window. For a reliable detection of a soiling, a proper detection signal frequency and detection signal duration are prerequisite for optimum detection of the soiling. Further insights have shown that the detection signal frequency and detection signal duration depend on the time scale over which the wavelength is varied. In other words, the wavelength variation speed should be set such that the soiling detection signal frequency is in a range from 1 kHz to 100 MHz, preferably from 1 kHz to 50 MHz, further preferably from 10 kHz to 1 MHz, and the soiling detection signal duration is in a range from 1 us to 5 ms, preferably from 10 us to 1 ms.

The soiling detection signal frequency f may be related with the predetermined time period T, the optical distance d between the laser diode and the emission window and the wavelength variation $\Delta\lambda$ by $f \approx (1/T) \cdot 2d \cdot (\Delta\lambda/\lambda^2)$, wherein $\lambda$ is the nominal wavelength of the laser beam emitted by the laser diode. As d is fixed, and $\Delta\lambda$ is limited for a laser diode around the nominal wavelength $\lambda$, the time period T (or variation speed $\Delta\lambda/T$) may be properly chosen to achieve the detection signal frequency and duration required for a reliable detection of the soiling. If the frequency is too low and/or the time duration of the detection signal too short, detection of the soiling may not be performed in a reliable manner.

The wavelength may be varied by solely increasing, solely decreasing or increasing and decreasing the wavelength.

The optical arrangement may comprise an optical element, e.g. lens, for focusing the laser beam to the focus region. One surface of the optical element may comprise the emission window. The emission window may, for example, be an outer surface of the lens. The emission window may alternatively be physically separated from the optical element, e.g. be a cover glass covering the optical element.

The wavelength variation for soiling detection may be based on a driving current variation and/or a bias voltage variation and/or a temperature variation of the laser diode. A driving current variation is preferred over a temperature variation since it allows for better control and setting of the predetermined time period than a temperature variation. A temperature variation, for a sufficient wavelength variation, occurs on a longer time scale so that the resulting soiling detection signal frequency is low. Using a driving current variation allows to set the predetermined time period shorter, resulting in higher detection frequencies.

Advantageously, a slope of the driving current variation may be set such that at least 3 sine waves, e.g. 3, 4, or 5 sine waves are available in the signal for proper detection. The slope may be a single slope or a plurality of slopes.

The slope may be in a range from 0.05 mA/ms to 1000 mA/ms, preferably in a range from 1.5 mA/ms to 150 mA/ms, further preferably in a range from 5 mA/ms to 50 mA/ms.

The soiling detection unit may be arranged to cause the electrical driver to provide a driving current to the laser diode which varies over the predetermined time period, wherein an amplitude of the driving current variation is in a range from e.g. 0.5 mA to 2 mA, and is preferably about 1 mA. A variation amplitude of the driving current in the given range may result in a sufficient wavelength shift, and in combination with a typical laser diode nominal wavelength and typical distance from the laser diode to the emission window produces a sufficient number of waves in the detection signal suitable for reliable signal readout.

The predetermined time period over which the wavelength is varied may be in a range from 1 us to 5 ms, e.g. from 10 us to 200 μs. Predetermined time periods in the given range over which the wavelength of the laser beam is varied have been found as being very suitable for generating the soiling detection signal with a frequency and duration in the desired ranges.

The soiling detection unit may be arranged to cause the electrical driver to provide a driving current to the laser diode which varies over the predetermined time period with a slope such that the wavelength of the laser beam varies linearly over the predetermined time period.

It is advantageous to vary the wavelength of the laser beam linearly over time, since the soiling detection signal then has a single fixed frequency. A single frequency is advantageous for detection. Nevertheless, the detection signal may also have a varying frequency, e.g. a frequency linearly changing over time.

In case the dependency of the emission wavelength on the driving current for the given laser diode is linear, the soiling detection unit may be arranged to cause the electrical driver to provide a driving current to the laser diode which varies with a linear slope over the predetermined time period. In case the dependency of the emission wavelength on the driving current is non-linear, the soiling detection unit may be arranged to cause the electrical driver to provide a driving current to the laser diode with a current variation profile or non-linear slope suitable to achieve a linear wavelength profile over the predetermined time period.

The driving current for driving the laser diode in order to vary the wavelength of the laser beam may vary with a single slope or with a plurality of slopes, e.g. in form of a saw tooth profile, during the predetermined time period.

The soiling detection unit may be arranged to cause the electrical driver to provide a driving current to the laser diode which varies over the predetermined time period according to a waveform. Such a waveform may be a triangle waveform or a sinusoidal waveform.

The varying driving current used for soiling detection may be below the driving current provided to the laser diode in a measurement mode of the laser sensor module. The measurement mode of the laser sensor module is a mode in which the laser sensor module operates to perform a measurement of, e.g. particle density, fluid velocity, a gesture, a distance to an object and/or the presence of objects. Usually, the laser diode is operated in a range of output power which is not dangerous to the eyes. Therefore, the afore-mentioned measure ensures eye safety also during the soiling detection operation of the laser sensor module.

It is a further insight that the soiling detection signal amplitude may hugely vary due to speckle patterns at the soiling location, e.g. a fingerprint on the emission window. These amplitude variations of the soiling detection signal may reduce soiling detection reliability. In an embodiment, these amplitude variations may be reduced, if the laser sensor module comprises more than one laser diode, e.g. two, three, four or more laser diodes each emitting a laser beam with a wavelength variation according to any of the embodiments described above and in the present description. According to the number of laser beams present, a corresponding number of independent and most likely different speckle patterns will be present at the soiling location. The likelihood that at least one of the laser beams back-scattered at the soiling produce(s) a detection signal with higher amplitude thus increases. The laser beams may be emitted simultaneously or in a time-interleaved manner.

Preferentially, the laser beams are directed by the optical arrangement such that they cross the emission window at substantially the same position. The laser beams cross the emission window preferentially under different angles so that different speckle patterns are created at the soiling location.

Another measure to reduce the signal amplitude variations may be to vary the speckle pattern itself, with or without providing more than one laser beam. Such a speckle pattern variation may be accomplished by displacing the laser diode(s) with respect to the emission window or by displacing the optical arrangement so that, for example the laser beam(s) cross(es) the emission window under varying angles. By performing multiple soiling detection measurements, the likelihood to obtain a detection signal with sufficient amplitude increases also in this embodiment.

According to a second aspect, a device comprising the laser sensor according to the first aspect is provided.

The device may be a particle detector, a fluid velocity detector, a gesture detector, an object detector, an air cleaner, ventilation hood or wearable device like a mobile communication device.

The device may comprise an indicator arranged to provide an indication to a user of the device based on the soiling detection signal. The indicator may comprise any kind of interface which is suited to inform the user. The indicator may, for example, comprise a loudspeaker or a display. The indicator may, for example, be a display of a mobile communication device. The indicator may, for example, present a corrected measured value, e.g. particle density, based on the indication signal to the user wherein the corrected value may, for example, be colored green (no relevant soiling), yellow or red (critical soiling) depending on the level of soiling of the emission window. The indicator may alternatively be a visible, audible or haptic signal indicating that the emission window is soiled or polluted in a critical way.

The device may be further arranged to determine a quantitative measure of the soiling of the emission window based on the soiling detection signal, and in case of particle detection to correct a measured particle density, based on the determined quantitative measure of the soiling. The raw data measured by means of the detector may be transferred to a device via an interface. The device may comprise an evaluator to determine the quantitative measure based on the raw data provided by the laser sensor module. The afore-mentioned functions may also be performed by the laser sensor device itself.

According to a third aspect, a method of detecting a soiling of an emission window of a laser sensor module is provided. The method comprises the steps of:

emitting a laser beam through the emission window, varying a wavelength of the laser beam over a predetermined time period, determining an interference signal based on the varying wavelength, providing a soiling detection signal indicative of a soiling of the emission window based on the interference signal determined during the variation of the wavelength.

According to a fourth aspect, a computer program is provided. The computer program comprises program code means for causing a laser sensor module of the first aspect or a device of the second aspect to carry out the steps of the method of the third aspect, when said computer program is carried out on a processor of the laser sensor module or on a processor of the device.

It is to be understood that the laser sensor module of the first aspect, the device of the second aspect and the method of the third aspect have similar and/or identical embodiments.

Further advantageous embodiments are defined below.

These and other aspects will be apparent from and elucidated with reference to the embodiments described hereinafter with reference to the drawings.

Figure 1:
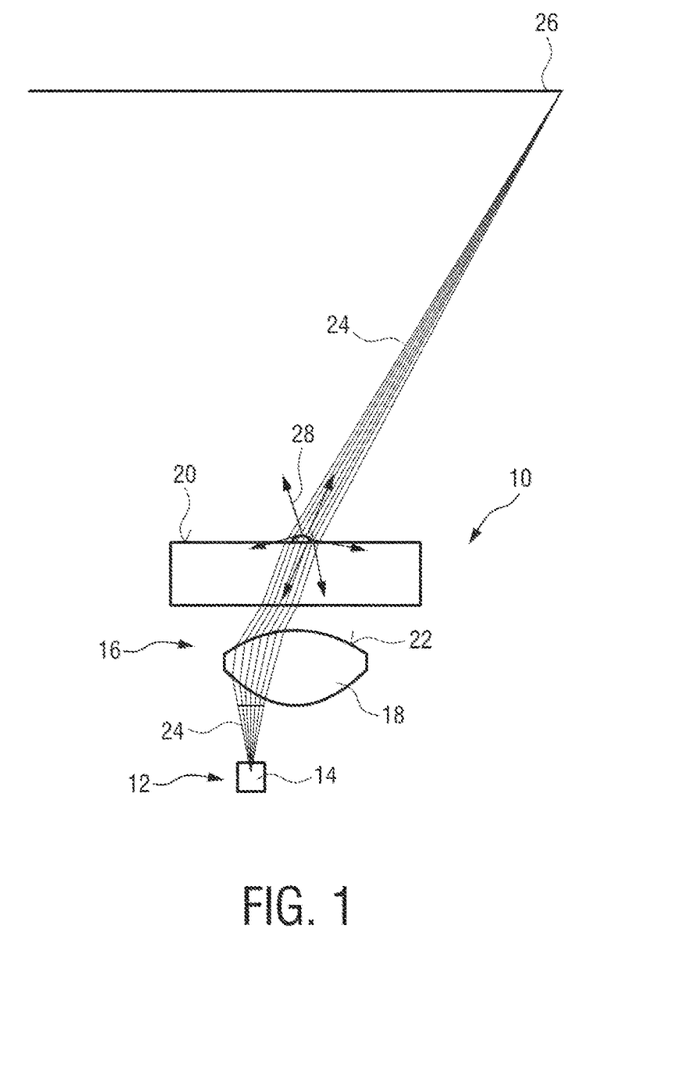
FIG. 1 shows a principle sketch of an optical configuration for a laser sensor module.
Figure 2:
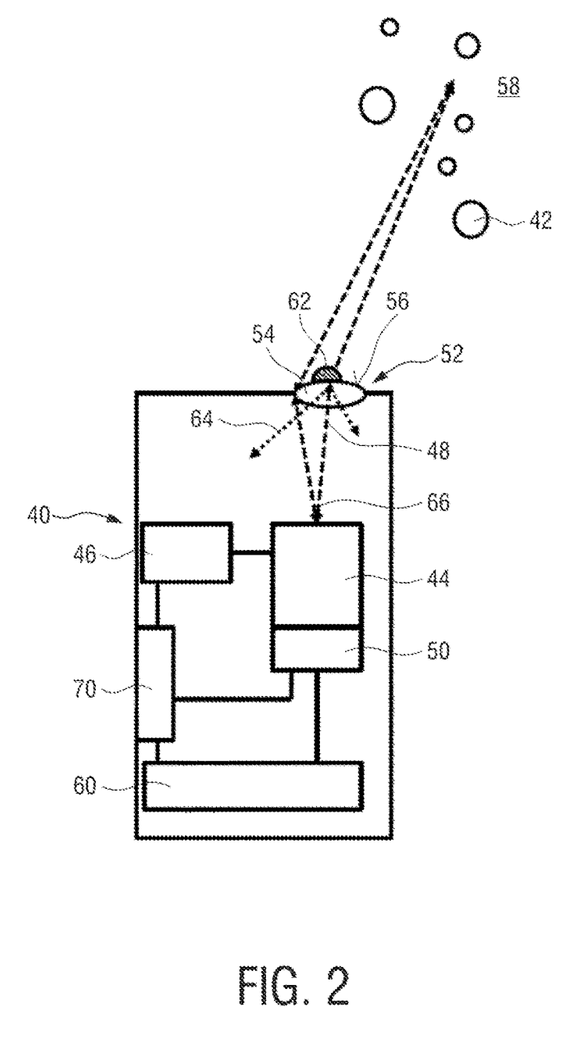
FIG. 2 shows a principle sketch of a laser sensor module according to an embodiment.
Figure 3:
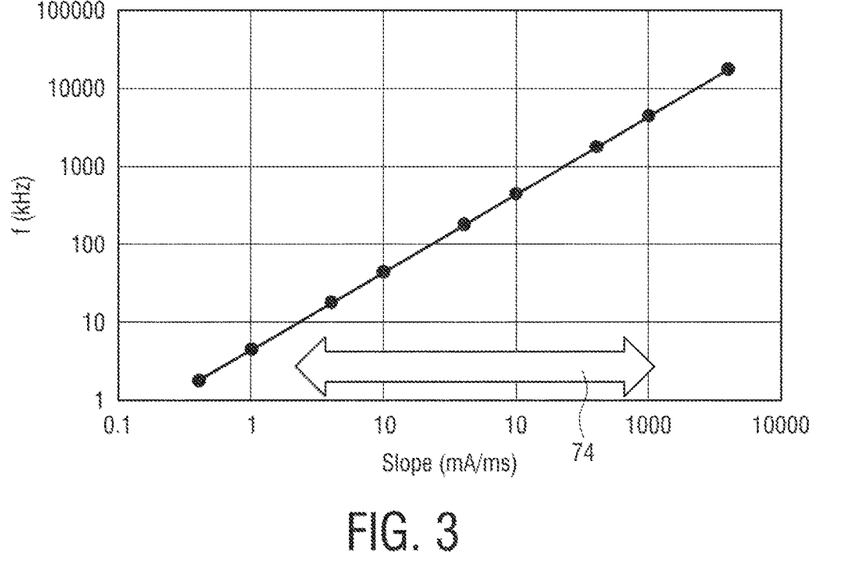
FIG. 3 shows a diagram of a soiling detection signal frequency as a function of slope of driving current variation.
Figure 4:
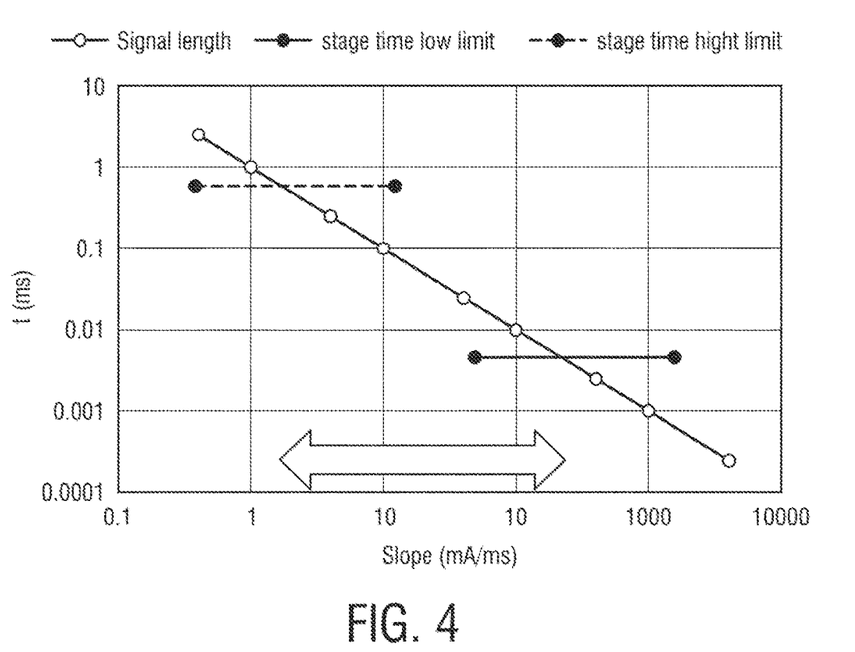
FIG. 4 shows a diagram of a soiling detection signal duration as a function of slope of driving current variation.
Figure 5:
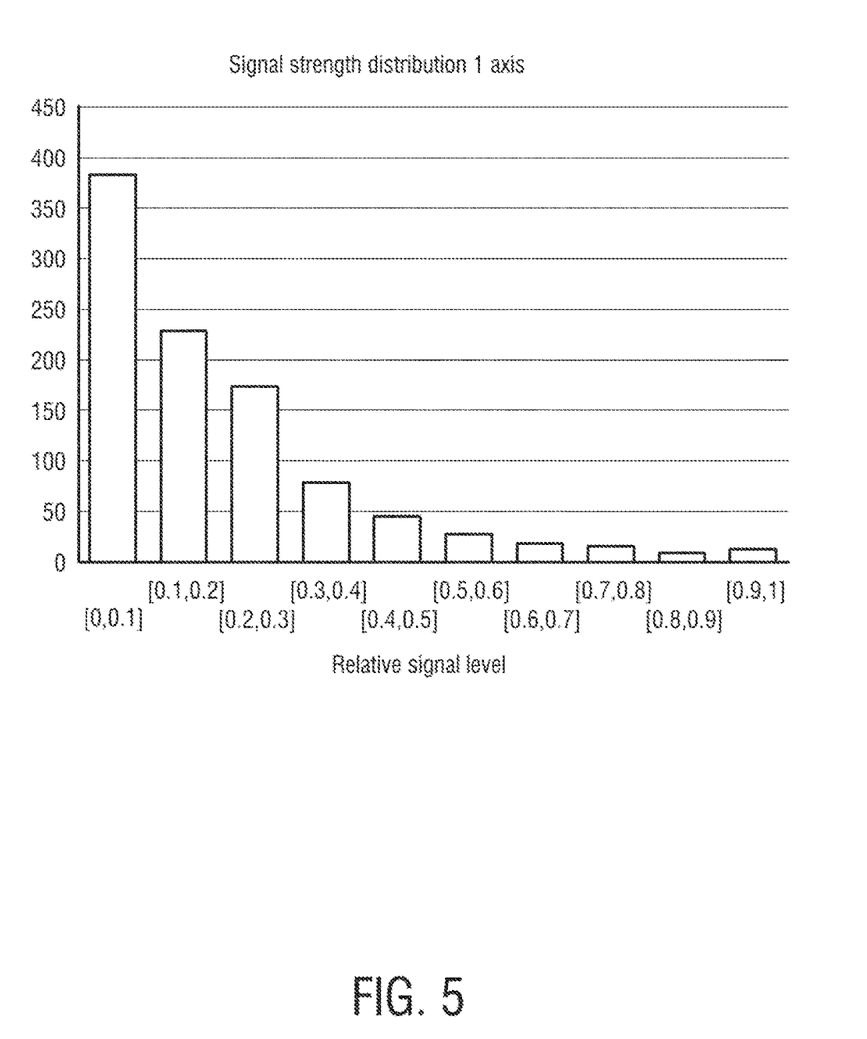
FIG. 5 shows a diagram of soiling detection signal amplitude distribution due to speckles when one laser beam is used for soiling detection.
Figure 6:
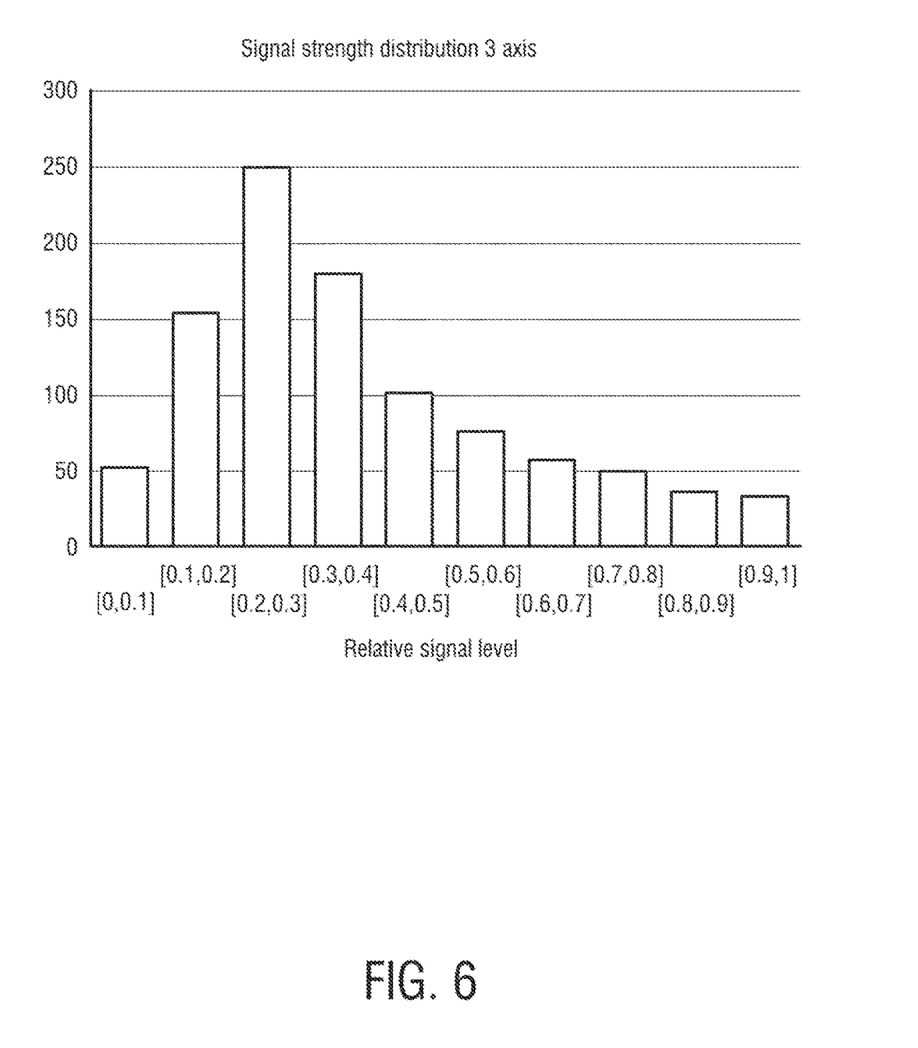
FIG. 6 shows a diagram of soiling detection signal amplitude distribution due to speckles when a plurality of individual laser beams are used for soiling detection.
Figure 7:
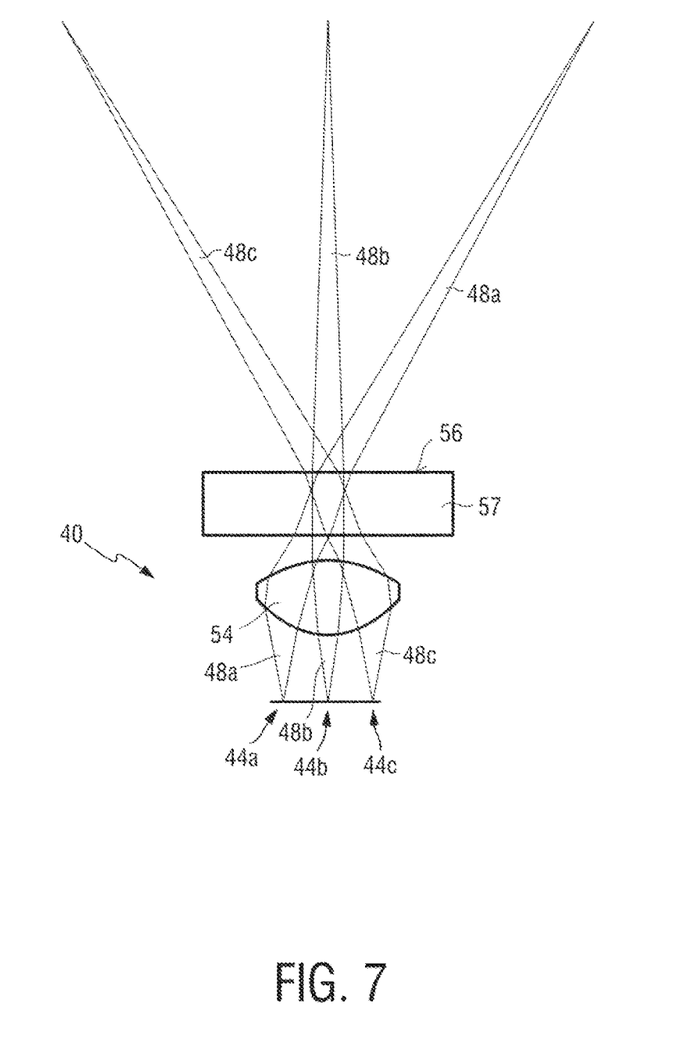
FIG. 7 shows an embodiment of an optical arrangement for a laser sensor module comprising three laser diodes.
Figure 8:
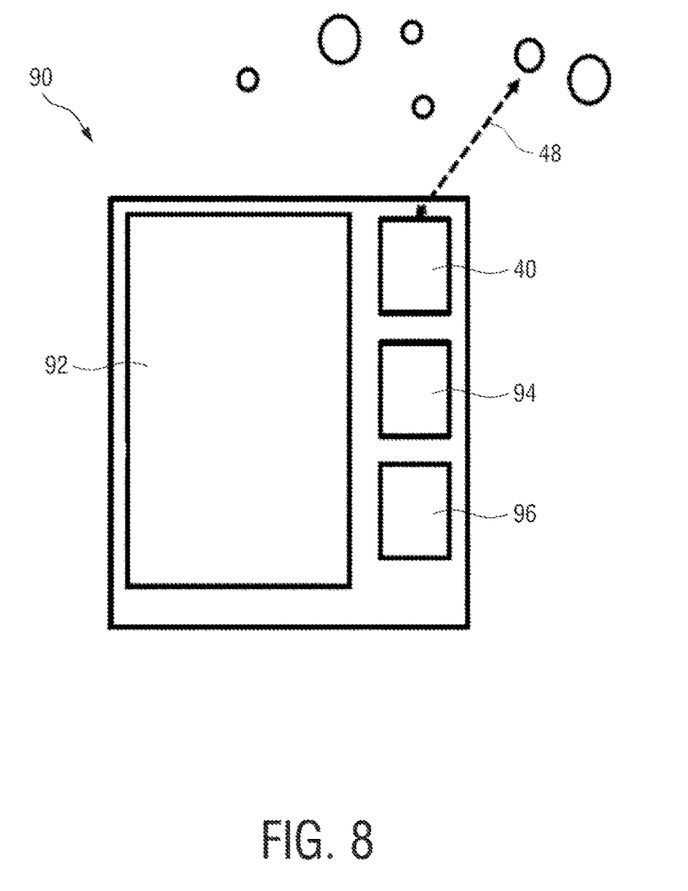
FIG. 8 shows a principle sketch of a mobile communication device.

FIG. 1 shows a principle sketch of an optical configuration for a laser sensor module;

FIG. 2 shows a principle sketch of a laser sensor module according to an embodiment;

FIG. 3 shows a diagram of a soiling detection signal frequency as a function of slope of driving current variation;

FIG. 4 shows a diagram of a soiling detection signal duration as a function of slope of driving current variation;

FIG. 5 shows a diagram of soiling detection signal amplitude distribution due to speckles when one laser beam is used for soiling detection;

FIG. 6 shows a diagram of soiling detection signal amplitude distribution due to speckles when a plurality of individual laser beams are used for soiling detection;

FIG. 7 shows an embodiment of an optical arrangement for a laser sensor module comprising three laser diodes;

FIG. 8 shows a principle sketch of a mobile communication device; and

Figure 9:
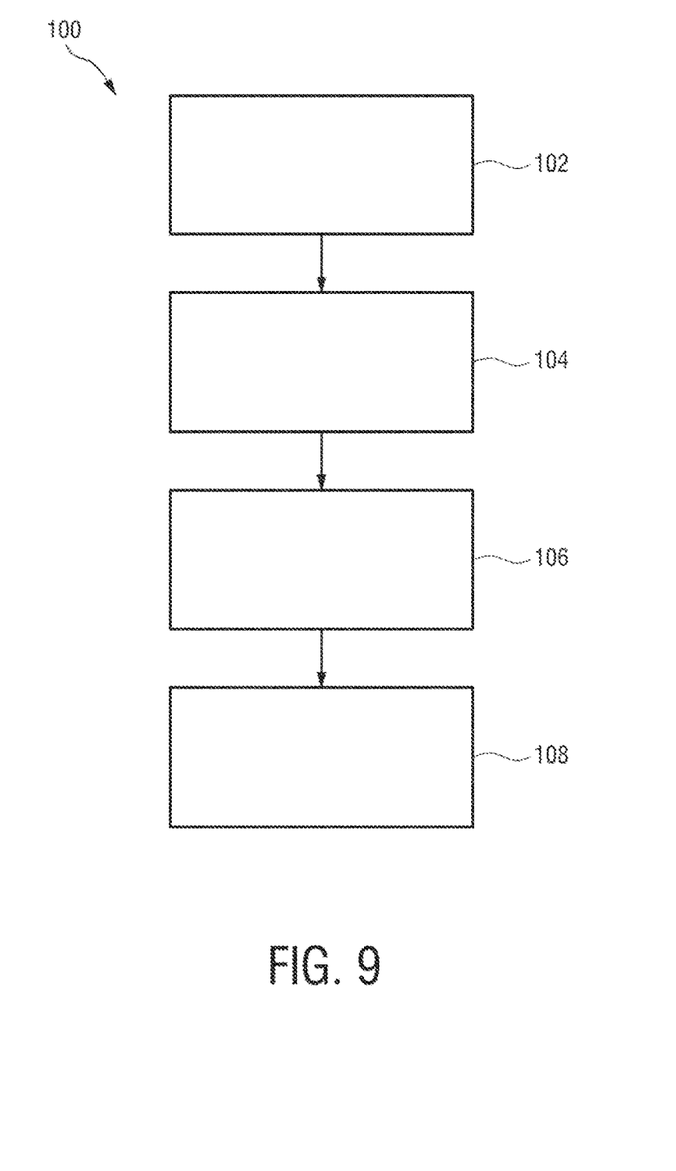
FIG. 9 shows a principle sketch of a method of detecting a soiling of an emission window of a laser sensor module.

FIG. 9 shows a principle sketch of a method of detecting a soiling of an emission window of a laser sensor module.

In the figures, like numbers refer to like objects throughout. Objects in the figures are not necessarily drawn to scale.

Before describing specific embodiments, a general description of self-mixing interference (SMI) will be provided.

Self-mixing interference is used for detecting movement of and distance to an object. Background information about self-mixing interference is described in "laser diode self-mixing technique for sensing applications", Giuliani, G.; Norgia, M.; Donati, S. & Bosch, T., Laser Diode Self-Mixing Technique for Sensing Applications, Journal of Optics A: Pure and Applied Optics, 2002, 4, p. 283-p. 294 which is incorporated herein by reference. Detection of movement of a fingertip relative to a sensor in an optical input device is described in detail in international patent application No. WO 02/37410 which is incorporated herein by reference. The principle of self-mixing interference is discussed based on the examples presented in international application No. WO 02/37410. A laser diode having a laser cavity is provided for emitting a laser or measuring beam. At one side, the device is provided with a transparent window across which an object, for example a finger, is moved. A lens is arranged between the laser diode and the window. This lens focuses the laser beam. When an object is present in the laser beam, it scatters the measuring beam. A part of the radiation of the measuring beam is scattered in the direction of the illumination beam and this part is converged by the lens towards the emitting surface of the laser diode and re-enters the cavity of this laser. The radiation re-entering the cavity of the laser diode induces a variation in the gain of the laser and thus in the intensity of radiation emitted by the laser, and it is this phenomenon which is termed the self-mixing effect in a laser diode.

The variation in intensity of the radiation emitted by the laser or of the optical wave in the laser cavity can be detected by a photodiode or a detector arranged to determine an impedance variation across the laser cavity. The diode or impedance detector converts the radiation variation into an electrical signal, and electronic circuitry is provided for processing this electric signal.

FIG. 1 shows an example of components of an optical configuration 10 for an SMI based laser sensor module which is exemplarily configured for particle detection. The optical configuration 10 comprises a laser diode/detector arrangement 12. The laser diode/detector arrangement 12 may comprise a Vertical Cavity Surface Emitting Laser with integrated photodiode both together labeled with reference numeral 14. Such an arrangement 14 is also abbreviated as VIP.

The optical configuration 10 further comprises an optical arrangement 16 which may comprise an optical component 18, e.g. a lens. The optical arrangement 16 further comprises an emission window 20. The emission window 20 may be a cover glass of a device, e.g. a mobile communication device, which comprises the optical configuration 10. The emission window 20 however, can also be an emission surface 22 of the optical component 18, e.g. a lens emission surface. The VIP 14 emits a laser beam 24 having a wavelength. The wavelength may be 850 nm, for example. The wavelength may be longer or shorter than 850 nm. Typically, laser diodes in form of VCSELs may emit laser light in a wavelength range of the near infrared or infrared spectrum. The laser beam 24 passes through the optical arrangement 16. The optical component 18 focuses the laser beam 24 to a focus region 26. Particles or objects (not shown) in the focus region 26 scatter back the laser light, and at least part of the laser light re-enters the laser diode through the optical component 16. The laser light re-enters the resonator cavity of the laser diode. The photodiode of the VIP 14 detects the self-mixing interference signal as described above.

The self-mixing interference signal may in case of particle detection, for example, be characterized by a short signal burst or a number of signal bursts. The Doppler frequency as observed in these signals is a measure for the particle velocity along the optical axis. It may therefore be preferred to induce a DC drive current in order to simplify signal detection and signal analysis. A modulated drive current may be used in order to determine the position or velocity of the particle, for example, by means of self-mixing interference signals which may be generated by reflection of laser light at bigger particles or disturbing objects. The distance (and optionally velocity) may be determined within one measurement and/or in the subsequent measurement step.

When the emission window 20 gets soiled or polluted, e.g. by fingerprints or dust, scattering of the laser beam 24 as indicated with arrows 28 will also occur on the soiling or pollution. Part of this scattered laser light will be reflected back into the laser diode 14. This scattered laser light re-entering the laser diode 14 also generates an SMI signal. The more soiling or pollution, the more laser light will be reflected or scattered back towards the laser diode 14. However, this scattered or reflected laser light will just give rise to a minor DC power change of the laser diode output, which also depends on the phase difference of the returning laser light with respect to the laser light in the laser diode. Consequently, the laser light scattered from the soiling or pollution cannot be used in a straightforward way to detect the soiling or pollution using the SMI laser sensor module.

In the following, a laser sensor module and method will be described to reliably detect a soiling or pollution of the emission window based on an interference signal, in particular an SMI signal. The detection of a soiling or pollution of the emission window 20 may be essential to the reliability and accuracy of the particle detection.

The soiling or pollution may be a fingerprint at a position where the laser beam 24 passes through (or crosses) the emission window 20. The soiling may also be fine dust particles on the emission window 20.

FIG. 2 shows a principle sketch of an embodiment of a laser sensor module 40. The laser sensor module 40 is configured in the present embodiment for measuring particle density of particles 42 with a size of less than 20 µm, preferably less than 10 µm in a fluid, like air. The laser sensor module 40 comprises a laser diode 44. It is to be understood that the laser sensor module 40 may comprise more than one laser diode 44, for example three or even more laser diodes 44 as will be described further below. The laser sensor module 40 further comprises an electrical driver 46 for supplying the laser diode 44 with a driving current such that the laser diode 44 emits a laser beam 48 when the laser diode 44 is supplied with an electrical drive current of sufficient strength. The laser sensor module 40 further comprises a detector 50. As described above, the detector 50 may be a photodiode integrated with the laser diode 44. The laser diode 44 may be a vertical cavity surface emitting laser (VCSEL) having integrated therewith the detector or photodiode 50, so that the arrangement of laser diode 44 and detector 50 is a VIP. The detector 50 may determine a self-mixing interference signal in the laser cavity of the laser diode 44. The detector 50 may according to an alternative embodiment (not shown) be a separate photodiode arranged to receive an interference signal based on the interference of emitted and reflected laser light. The laser diode 44 is arranged to emit laser light (like laser beam 48) to an optical arrangement 52 which may comprise a lens 54. The outer surface of the lens 54 comprises an emission window 56 of the laser sensor module 40. In other embodiments (see FIG. 1) the emission window 56 may be formed by an outer surface of a cover glass as known from mobile communication devices. The optical arrangement 52 focuses the laser beam 48 to a focus region 58. Particles 42 in the focus region 58 reflect or scatter part of the laser light back to the lens 54 and finally to the laser cavity of the laser diode 44 resulting in a self-mixing interference of the standing wave pattern in the laser cavity with the reflected laser light. The corresponding self-mixing interference signal is detected by means of the detector 50 and a corresponding measurement signal transmitted to an evaluator 60 for evaluating the interference signal in order to measure particle density, for example.

When the emission window 56 gets soiled or polluted as illustrated with a soiling 62, scattering of laser light on this soiling 62 will occur, as illustrated by arrows 64. A part of this scattered light (indicated by arrow 66) will re-enter the laser diode 44. The more pollution or soiling 62, the more laser light will be scattered or reflected towards the laser diode 42. This reflected light just will give rise in a minor DC power change of the laser output, which also depends on the phase difference of the returning laser light with respect to the laser light in the laser diode 44. Consequently, the scattered laser light from the soiling or pollution 62 cannot be used in a straightforward way to detect pollution using the self-mixing interference laser sensor.

In order to enable laser sensor module 40 to reliably detect the soiling 62 of the emission window 56, the laser sensor module 40 comprises a soiling detection unit 70. The soiling detection unit 70 is configured to vary a wavelength of the laser beam 48 over a predetermined time period to provide a soiling detection signal indicative of the soiling 62 of the emission window 56, based on an interference signal as detected by the detector 50 during the wavelength variation of the laser beam 48 as will be described in more detail below. The detector 50 may determine the soiling detection interference signal during the wavelength variation and the evaluator 60 may evaluate or further process the soiling detection signal, e.g. in order to generate a warning to the user and/or to correct a measured parameter, e.g. particle density.

The wavelength variation of the laser emission of the laser diode 44 causes an optical path length variation (in number of waves).

A wavelength variation of the laser beam 48 may result from a driving current variation and/or a bias voltage variation and/or a temperature variation.

One source of a wavelength variation is by the laser diode 44 itself, when the driving current of the laser diode 44 is switched on. This results in an increase in wavelength, given by a parameter $\Delta\lambda/\Delta I$ or $d\lambda/dI$, wherein $\Delta\lambda$ or $d\lambda$ is the wavelength variation and $\Delta I$ or $dI$ the current variation. A typical value of $d\lambda/dI$ for a VCSEL laser diode having a nominal output wavelength of 850 nm is 0.65 nm/mA. A typical laser diode driving current for 0.5 mW output power is 1.75 mA. This means that practically about 1 mA current variation can be used for reliable detection with a sufficient signal-to-noise ratio (SNR). At very low output powers the SNR is too poor. Thus, with a current variation with an amplitude of 1 mA, a wavelength variation of 0.65 nm can be achieved. This wavelength variation occurs almost instantaneously, on a time scale of ≈1 µs.

Another source of a wavelength variation occurs due to a heating of the laser diode 44 while being switched on. Such a temperature variation occurs on a time scale of about 1 s which is long compared with the time scale on which the emission wavelength varies with a variation of the driving current. The wavelength variation as a function of temperature variation is about 0.065 nm/K. For e.g. 30 degrees temperature rise, this results in a wavelength shift of about 2 nm.

Driving current variation as well as temperature variation basically may be used for varying the wavelength of the laser beam 48 to generate suitable soiling detection interference signals for the detection of the soiling 62 of the emission window 56.

For a proper and reliable soiling detection signal, the time scale on which the wavelength variation occurs may be important. Assuming the laser diode is switched on (or is heating up) with a linear slope in T seconds. The frequency variation of the soiling detection signal which is induced by the wavelength variation is given by $f \approx (1/T) \cdot 2d \cdot (\Delta\lambda/\lambda^2)$, wherein f is the frequency of the soiling detection signal, T the rise time (predetermined time period) of the wavelength variation, d the optical distance from the laser diode 44 to the emission window 56, Δλ the wavelength variation and λ the nominal or operation wavelength of the laser diode 44.

For each detection system, e.g. as given by the detector 50, the requirements on the wavelength variation rise time T (the predetermined time period) and the duration of the soiling detection signal may be somewhat different. By choosing a proper value of T, the detection signal frequency and detection signal duration can be tuned such that optimum detection properties are obtained. This results in highest SNR values for the detection signals resulting from soilings like fingerprints or other pollutions on the emission window 56. This will be further described below.

For most reliable detection of the interference signal resulting from the soiling 62, it is desired that the soiling detection signal is generated with a single frequency. In case the wavelength variation is generated by a driving current variation, which is preferred, this means that the driving current variation should be linear over time. In case of non-linear conversion of laser driving current to wavelength, a somewhat adapted current profile to achieve a linear wavelength variation profile can be used. Thus, it is preferred if the soiling detection unit 70 is arranged to cause the electrical driver 46 to provide a driving current to the laser diode which varies over the predetermined time period T such that the wavelength of the laser beam 48 varies linearly over the predetermined time period.

Although a single frequency of the soiling detection signal has advantages, other characteristics like e.g. a linear change in frequency of the soiling detection signal over time are not excluded.

On the part of the detector 50, its electronics should be able to determine a small frequency signal on a large slope signal due to the power variations of the laser which occur due to the driving current variations.

The laser sensor module 40 is enabled to detect the soiling detection signal frequency or frequencies generated by the stray laser light from the soiling 62 in combination with the wavelength variations mentioned above. Principally, the same method as used for detection of particles, e.g. using a Fast Fourier Transform (FFT) tree solution, can be used to detect the generated soiling detection signal frequency or frequencies.

In order to achieve reliable detection, the soiling detection signals should have a frequency in a detectable frequency range. As described above, the soiling detection signal frequency depends on the rise time T over which the wavelength variation occurs. This rise time is also referred to as predetermined time period in the present disclosure. A proper frequency range for the soiling detection signal is between 1 kHz and 10 MHz, for example. Thus, the soiling detection unit 70 is configured to set the predetermined time period such that the soiling detection signal is generated with a frequency in a range from 1 kHz to 100 MHz, preferably from 1 kHz to 50 MHz, further preferably from 10 kHz to 1 MHz. Such a frequency range is suitable when e.g. the FFT tree solution for the detection of the signal is used.

If the wavelength variation of the laser beam 48 is based on a temperature variation, the resulting detection signal frequency might be too low. For example, for a rise time T of 1 s, over which the wavelength varies due to heating up, a detection signal with a frequency of as low as about 15 Hz may be generated. This frequency might be too low for reliable detection. Furthermore, due to typical exponential functions for heating, the signal detection frequency will vary over time which is not optimal. Therefore, it is more preferred that the wavelength variation for soiling detection is based on a driving current variation.

When using a driving current variation in order to generate a wavelength variation of the laser beam 48, the time scale or rise time T on which the wavelength variation is generated can be set to lower values to achieve a soiling detection signal frequency which is high enough for proper detection.

This is possible by switching on the laser driving current with a desired rise time T. The amplitude of the driving current variation should be about 1 mA. This is because the laser diode 44 must be sufficiently on for reliable detection of the soiling detection signal. A further reason is that for reliable signal detection preferably e.g. about 5 sine waves are available. For example, having a wavelength shift of 0.65 nm/mA in combination with the typical optical distance from the laser diode 44 to the emission window 56 of 2.5 mm and a nominal laser wavelength of 850 nm, this results in 4.5 sine waves. Thus, the soiling detection unit 70 may be arranged to cause the electrical driver 46 to provide a driving current to the laser diode 44 which varies over the predetermined time period T with an amplitude in a range from 0.05 mA to 2 mA, preferably of about 1 mA. Further, the soiling detection unit 70 may be arranged to cause the electrical driver 46 to provide a driving current to the laser diode 44 which varies with a slope. e.g. a linear slope, over the predetermined time period T.

FIG. 3 shows the resulting SMI frequency f as a function of laser driving current slope. The laser driving current slope is given in mA/ms. The laser driving current slope is a measure for the wavelength variation amplitude and rise time T and consequently determines the frequency f of the soiling detection signal. The soiling detection signal frequency range may be between 1 kHz and 10 MHz as described above. In order to generate a frequency of the soiling detection signal in this range, the slope of the laser driving current variation may be in a range between 2 and 1000 mA/ms. This range is a preferred working range of slopes of laser driving current variation and is indicated by an arrow 74 in FIG. 3.

The afore-mentioned slopes of the driving current variation can be generated using a short rise time T with low variation amplitudes or by using a relatively long rise time T with high variation amplitude. For short distances from the laser diode 44 to the emission window 56 high variation amplitudes are preferred to generate enough sinusoidal signal waves. A further reason for this preference is to generate a soiling detection signal with long enough signal duration.

Using an FFT algorithm as the soiling detection algorithm, the soiling detection signal duration should be larger than one detection block for reliable detection. The typical length of a detection block may correspond to 4.5 μs for the highest detection frequencies, and about 0.6 ms for the lowest detection frequencies.

FIG. 4 shows a diagram showing the soiling detection signal duration t as a function of driving current variation slope, for single variation slopes. The diagram has been made for 1 mA variation amplitude and typical 850 nm VCSEL characteristics. The soiling detection signal duration t in a range from 0.005 ms to 0.5 ms matches the detection window for a specific ASIC design when the driving current variation slope is in a range between 1.5 und 150 mA/ms. Thus, good detection results can be achieved for driving current variation slopes in the order of 10 mA/ms to 100 mA/ms, both from the point of view of soiling detection signal duration and soiling detection signal frequency. The soiling detection module may be configured to cause electrical driver 46 to provide a driving current to the laser diode 44 which varies with a slope, for example a linear single slope, in a range from 1.5 mA/ms to 1000 mA/ms, preferably in a range from 1.5 mA/ms to 150 mA/ms, further preferably in a range from 10 mA/ms to 100 mA/ms.

The afore-mentioned numbers in mA/ms are for a single driving current variation slope with an amplitude of variation of 1 mA. At lower variation amplitudes the detection signals will become too short for reliable detection, therefore it is preferred to aim at about 1 mA driving current variation for detection. For such an amplitude, the rise time or predetermined time period T of current variation should be between 10 μs and 100 μs. This is basically possible using a stepped current increase (DAC). For instance, a step size of 5 μA can be made, thereby realizing a 100 μs slope in 200 steps of 0.5 μs each. Alternatively, an analogue circuit can be used which is able to generate a linear driving current ramp.

When considering laser diode output power, the 1 mA laser driving current variation results in 0.4 mW output power variation for a typical laser diode having an output power slope of 0.4 mW/mA. For a VCSEL with integrated photodiode (VIP), the photodiode current at 1 mW laser diode output power is typically 1 mA. This means that 400 μA photodiode current variations will be present. The photodiode analogue front-end should be able to handle such a photodiode current variation. This can be done using proper bandpass filtering in the analogue front-end. Alternatively, active cancellation of the DC current can be done, either in an analogue way or digitally. A photodiode analogue front-end typically has a digital DC current cancellation. In this situation a solution to avoid clipping in the analogue front-end is to apply with the stepping laser driving current also a stepwise adaptation of the photodiode current cancellation.

As a practical example, the correct laser driving current for the correct laser power may be determined firstly. This can be part of a laser power setting trimming in a final control, where the laser diode power as the function of laser driving current is measured. After this trimming procedure, the photodiode current slope is also known and it is known how to control the laser driving current and the photodiode current cancellation.

After that, nominal laser power may be decreased to a 1 mA lower value in the laser driving current, and the evaluation of the soiling detection signals may be performed. Using such a method, eye safety is ensured. Thus, the varying driving current in the predetermined time period preferably is below the driving current provided to the laser diode 44 when measuring particle density.

Based on the detected soiling, in firmware it can be decided to make a correction of the measured particle density based on the determined signal strength of the soiling detection signal. Alternatively, the user can be given a warning to clean the emission window 56 before measuring particle density.

Other embodiments than those described above can be envisaged. For example, instead of a single driving current variation slope, the soiling detection unit 70 may be arranged to cause the electrical driver 46 to provide a driving current to the laser diode 44 which varies over the predetermined time period T according to a waveform, i.e. increases and decreases over the predetermined time period T. In particular, the waveform may be a triangle waveform. This may be advantageous as the soiling detection signal duration may be increased. When a triangle driving current waveform is used, it may be beneficial to adjust the variation amplitude such that the SMI signal has no phase jump around the transition point. In this case, the synchronization of the signal slope with the FFT is not relevant.

Laser light reflections may also occur from the printed circuit board (PCB) which have an about 2 times longer path to travel than the laser light scattered or reflected from the soiling. This means that in the detection method a discrimination may be made between soiling detection signals and eventual other signals originating from other locations of the laser sensor module 40.

Further, bandpass filters, notch filters, matched filters, zoom FFT and others may be used for optimum detection of the frequency of the soiling detection signal. Optionally, additional digital detrending can be used. If desired, the FFT design (block size and center rate) can be adapted in order to fit more optimal to the detection of soilings like fingerprints on the emission window 56.

Another aspect of soiling detection will be described in addition with reference to FIGS. 5 to 7.

The soiling 62 (e.g. fingerprint, fine dust, smudge) of the emission window 56 in FIG. 2 may give rise to a speckle pattern of the laser light beam 48 at the soiling location. The speckles cause large variations of the amplitude of the soiling detection signal which deteriorates the soiling detection signal and thus reduces reliability of soiling detection. The effect of the speckles on the amplitude of the detection signal when only one laser beam 48 fixed in space (1 emission axis) is used for soiling detection is shown in FIG. 5. FIG. 5 shows an example distribution of measured detection signal strengths as derived from a diffusor plate (simulating a soiling). The horizontal axis in the diagram in FIG. 5 shows the relative detection signal level (with respect to the maximum signal level measured), and the vertical axis shows the number of occurrences of the relative signal levels in the measurement. As can be seen in FIG. 5, the smallest signal strengths have the highest probability of occurrence. This is an unfavorable situation for the detection of soiling of the emission window.

A measure to improve the detection of soiling when having speckles is to have more laser beams for soiling detection, eg. two, three, four or even more. When multiple laser beams are emitted and passed through the emission window 56, a corresponding number of independent speckle patterns will be present on the emission window at the soiling location. This means that the chance to have a speckle pattern with higher signal level available increases. FIG. 6 shows a diagram similar to FIG. 5, wherein now 3 (as an example) laser beams are used for soiling detection. FIG. 6 shows the distribution of signal strengths when the maximum signal strength as obtained from the signals of the three beams individually is used. The likelihood to achieve measurable signals from the soiling on the emission window 56 is largely increased. When multiple laser beams are used, it is favorable that all laser beams cross the emission window 56 (the outer surface of a cover glass or of the lens 54) at about the same position, such that the measurement position is the same for all laser beams and equal to the position which may result in the reduced count rate by the soiling 62.

The laser sensor module 40 thus may have a plurality of laser diodes 44 and a corresponding number of detectors 50. FIG. 7 shows a portion of an embodiment of a laser sensor module 40 comprising, as an example, three laser diodes 44a, 44b, 44c emitting laser beams 48a, 48b, 48c. An optical arrangement comprises a lens 54 which is designed to direct the laser beams 48a, 48b, 48c through the cover glass 57 such that the laser beams cross the emission window 56 which here is the outer surface of the cover glass 57, at substantially the same position as shown in FIG. 7. For soiling detection, the wavelengths of the laser beams are varied as described herein. The laser beams 48a, 48b, 48c may be emitted simultaneously or sequentially.

Another embodiment to reduce the signal amplitude variations may be to vary the speckle pattern itself, with or without providing more than one laser beam. Such a speckle pattern variation may be accomplished by displacing the laser diode(s) with respect to the emission window or by displacing the optical arrangement so that, for example the laser beam(s) cross(es) the emission window under varying angles. By performing multiple soiling detection measurements, the likelihood to obtain a detection signal with sufficient amplitude increases.

FIG. 8 shows a principle sketch of a mobile communication device 90 comprising a laser sensor module 40 as described above. The laser sensor module 40 is adapted to emit one or more laser beams 48 as described above with respect to FIG. 7. The mobile communication device 90 comprises a user interface 92 which may be configured as a touchscreen. The mobile communication device 90 further comprises a main processing device 94 and connected therewith a main memory device 96. The main processing device 94 is also connected with the laser sensor module 40. The main processing device 94 may comprise at least a part of the functionalities of the evaluator 60 which are described above. The main processing device 94 stores data related for example to particle detection in the main memory device 96. In an alternative embodiment, it may also be possible that the main processing device 94 and the main memory device 96 are only used to prepare or adapt data provided by means of the laser sensor module 40 such that the data can be presented to a user of the mobile communication device 90 by means of user interface 92. The laser sensor module 100 may be powered by means of a power supply of the mobile communication device 90. The main processing device 94 may be arranged to determine the soiling of the emission window of the laser sensor module 40 as described above during a wavelength variation of the laser beam(s) 48 as described above. The main processing device 94 may be further arranged to calculate and to correct the particle density based on the soiling detection signal or to initiate an error signal. The same principle may be used in other devices comprising the laser sensor module 40. An air cleaner or ventilation hood, a velocity detector, a gesture detector, an object detector may, for example, comprise the laser sensor module 40.

FIG. 9 shows a principle sketch of a method 100 of detecting a soiling of an emission window of a laser sensor module like emission window 56 of laser sensor module 40 described above. In a step 102, a laser beam 48 is emitted through the emission window 56 to a focus region. In step 104, the wavelength of the laser beam 48 is varied over a predetermined time period T. In step 106, an interference signal during the predetermined time period T is determined. In step 108, based on the interference signal determined during the predetermined time period, a soiling detection signal indicative of a soiling of the emission window 56 is provided. Step 108 may be followed by correcting measured particle density based on the soiling detection signal. Alternatively or additionally, step 108 may be followed by outputting an indication based on the soiling detection signal.

The functionalities of detecting a soiling of the emission window may be stored as a computer program in the memory 96 of the device 90. The device 90 or the laser sensor module may perform the soiling detection upon each start of the laser sensor module 40, in particular each time when a measuring mode, e.g. for particle detection, of the device 90 is activated. It is also possible to activate the soiling detection from time to time during performing a measurement, like particle detection, velocity measurement, etc.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A laser sensor module, comprising:
a laser diode configured to emit a laser beam,
an electrical driver configured to supply the laser diode with a driving current to stimulate emission of the laser beam,
a detector configured to determine an interference signal, and
an optical arrangement configured to focus the laser beam to a focus region, the optical arrangement comprising an emission window, and
a soiling detection unit configured to vary a wavelength of the laser beam with a variation amplitude over a predetermined time period to provide a soiling detection signal indicative of a soiling of the emission window based on the interference signal detected during the varying the wavelength of the laser beam,
wherein the variation amplitude and the predetermined time period are set to generate the soiling detection signal with a soiling detection signal frequency in a range from 1 kHz to 100 MHz and a soiling detection signal duration in a range from 1 μs to 5 ms.

2. The laser sensor module of claim 1, wherein the varying the wavelength is based on at least one of a driving current variation, a bias voltage variation, or a temperature variation.

3. The laser sensor module of claim 1, wherein the varying the wavelength is based on a driving current variation, wherein a slope of the driving current variation is set such that at least three sine waves are present in the soiling detection signal.

4. The laser sensor module of claim 1, wherein the varying the wavelength is based on a driving current variation, wherein the soiling detection unit is arranged to cause the electrical driver to provide the driving current to the laser diode which varies over the predetermined time period,
wherein an amplitude of the driving current variation is in a range from 0.05 mA to 2 mA.

5. The laser sensor module of claim 1, wherein the predetermined time period is in a range from 10 µs to 1 ms.

6. The laser sensor module of claim 1, wherein the soiling detection unit is arranged to cause the electrical driver to provide the driving current to the laser diode which varies with a linear slope over the predetermined time period.

7. The laser sensor module of claim 1, wherein the soiling detection unit is arranged to cause the electrical driver to provide the driving current to the laser diode which varies over the predetermined time period with a slope such that the wavelength of the laser beam varies linearly over the predetermined time period.

8. The laser sensor module of claim 3, wherein the slope is a single slope.

9. The laser sensor module of claim 3, wherein the soiling detection unit is arranged to cause the electrical driver to provide the driving current to the laser diode which varies over the predetermined time period according to a wave form.

10. The laser sensor module of claim 1, wherein the varying the wavelength is based on a driving current variation, wherein the driving current during the driving current variation in the predetermined time period is below a first driving current provided to the laser diode in a measurement mode of the laser sensor module.

11. The laser sensor module of claim 1, further comprising a plurality of additional laser diodes, the laser diode and the plurality of additional laser diodes arranged to emit respective individual laser beams, wherein the soiling detection unit is configured to vary the wavelength of the laser beams to provide the soiling detection signal based on respective interference signals during the varying the wavelength of the laser beams.

12. The laser sensor module of claim 11, wherein the optical arrangement is configured to direct the laser beams emitted by the laser diode and the plurality of additional laser diodes such that the laser beams are incident on the emission window at substantially a same position.

13. A device comprising the laser sensor module of claim 1.

14. A method of detecting a soiling of an emission window of a laser sensor module, the method comprising:
emitting a laser beam through the emission window,
varying a wavelength of the laser beam with a variation amplitude over a predetermined time period,
determining an interference signal based on the varying the wavelength, and
providing a soiling detection signal indicative of a soiling of the emission window based on the interference signal determined during the varying the wavelength,
wherein the variation amplitude and the predetermined time period are set to generate the soiling detection signal with a soiling detection signal frequency in a range from 1 kHz to 100 MHz and a soiling detection signal duration in a range from 1 µs to 5 ms.

15. A non-transitory computer-readable medium having a program code stored thereon, the program code, when executed by a processor of a laser sensor device, causing the laser sensor device to perform the method of claim 14.

* * * * *